United States Patent
Andreae et al.

(10) Patent No.: US 9,617,085 B2
(45) Date of Patent: *Apr. 11, 2017

(54) TILTING MULTIPLIER

(71) Applicant: SST Systems, Inc., Sturgeon Bay, WI (US)

(72) Inventors: Brad Martin Andreae, Sturgeon Bay, WI (US); Chad Martin Andreae, Sturgeon Bay, WI (US)

(73) Assignee: SST Systems, Inc., Sturgeon Bay, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/231,165

(22) Filed: Aug. 8, 2016

(65) Prior Publication Data

US 2016/0340132 A1 Nov. 24, 2016

Related U.S. Application Data

(63) Continuation of application No. 14/697,237, filed on Apr. 27, 2015, now Pat. No. 9,409,730, which is a (Continued)

(51) Int. Cl.
| | |
|---|---|
| *B65G 17/20* | (2006.01) |
| *B65G 49/04* | (2006.01) |
| *B66C 19/00* | (2006.01) |
| *B66C 13/08* | (2006.01) |
| *C25D 17/06* | (2006.01) |
| *C25D 13/22* | (2006.01) |
| *B05D 1/18* | (2006.01) |

(Continued)

(52) U.S. Cl.
CPC ...... *B65G 49/0459* (2013.01); *B05B 13/0221* (2013.01); *B05C 3/02* (2013.01); *B05D 1/02* (2013.01); *B05D 1/18* (2013.01); *B65G 17/20* (2013.01); *B66C 13/08* (2013.01); *B66C 19/00* (2013.01); *C25D 5/00* (2013.01); *C25D 7/00* (2013.01); *C25D 13/22* (2013.01); *C25D 17/06* (2013.01)

(58) Field of Classification Search
None
See application file for complete search history.

(56) References Cited

U.S. PATENT DOCUMENTS

| | | |
|---|---|---|
| 2,707,053 A | 4/1955 | Browning |
| 3,510,909 A | 5/1970 | Herzog |

(Continued)

*Primary Examiner* — William R Harp
(74) *Attorney, Agent, or Firm* — Michael Best & Friedrich LLP

(57) ABSTRACT

A method of operating a tilting carrier assembly includes operating a conveyor in a primary direction of travel and supporting a work piece from the conveyor by a pair of links. A pair of respective upper connection points of the links are laterally spaced transverse to the primary direction of travel and a pair of respective lower connection points of the links are also laterally spaced. The work piece is conveyed along the primary direction of travel relative to a work station, and the upper connection points are tilted so that a line therebetween forms a first angle relative to horizontal. In response, the lower connection points and the work piece are tilted to a second angle relative to horizontal, and the second angle is greater than the first angle.

21 Claims, 5 Drawing Sheets

Related U.S. Application Data continuation of application No. 13/829,446, filed on Mar. 14, 2013, now Pat. No. 9,016,464.

(60) Provisional application No. 61/620,155, filed on Apr. 4, 2012.

(51) Int. Cl.
  *C25D 5/00*   (2006.01)
  *B05B 13/02*  (2006.01)
  *B05C 3/02*   (2006.01)
  *B05D 1/02*   (2006.01)
  *C25D 7/00*   (2006.01)

(56) References Cited

U.S. PATENT DOCUMENTS

| | | |
|---|---|---|
| 3,567,040 A | 3/1971 | Thomson |
| 4,192,331 A | 3/1980 | Koering |
| 4,286,722 A | 9/1981 | Tax et al. |
| 4,772,374 A | 9/1988 | Urquhart et al. |
| 4,942,956 A | 7/1990 | Acker et al. |
| 5,012,918 A | 5/1991 | Acker et al. |
| 5,110,440 A | 5/1992 | Case |
| 5,151,006 A | 9/1992 | Marttila et al. |
| 5,257,891 A | 11/1993 | Baumann et al. |
| 5,364,469 A | 11/1994 | Wakabayashi |
| 5,531,830 A | 7/1996 | Ichinose et al. |
| 6,126,023 A | 10/2000 | Durrant-Whyte et al. |
| 6,991,087 B2 | 1/2006 | Krannich et al. |
| 7,134,541 B2 | 11/2006 | Matsubara et al. |
| 7,238,392 B2 | 7/2007 | Kyotani |
| 7,287,740 B2 | 10/2007 | Reyes et al. |
| 7,293,505 B2 | 11/2007 | Matsubara et al. |
| 9,016,464 B2 * | 4/2015 | Andreae .............. B66C 19/00 198/678.1 |
| 9,409,730 B2 * | 8/2016 | Andreae .............. B66C 19/00 |
| 2008/0093322 A1 | 4/2008 | Ehrenleitner |
| 2010/0326832 A1 | 12/2010 | Albeck et al. |
| 2011/0017132 A1 | 1/2011 | Robbin |

* cited by examiner

TILTING MULTIPLIER

CROSS-REFERENCE TO RELATED APPLICATIONS

This application is a continuation of U.S. patent application Ser. No. 14/697,237, filed Apr. 27, 2015, now U.S. Pat. No. 9,409,730 which is a continuation of U.S. patent application Ser. No. 13/829,446, filed Mar. 14, 2013, now U.S. Pat. No. 9,016,464 which claims priority to U.S. Provisional Patent Application No. 61/620,155, filed Apr. 4, 2012, the entire contents of all of which are incorporated by reference herein.

BACKGROUND

The present invention relates to finishing systems and processes for manufactured parts, and more particularly to carriers for transporting manufactured parts through a finishing process and methods relating to the same. For example, a finishing process can include an electroplating process whereby manufactured parts are immersed in one or a sequential plurality of fluids. The shape of complex parts (e.g., automotive bodies) can introduce difficulty in ensuring full coverage of the parts (via elimination of trapped air), and also drainage of fluid from the parts after removal from a dip tank. Typically, surface coverage may suffer, or very complex and costly machines must be utilized to ensure good coverage of and drainage from complex parts. One such machine is described in U.S. Pat. No. 4,772,374, the entire contents of which are hereby incorporated by reference. This patent also describes some of the advantages of eliminating trapped air during electrodeposition or electropainting processes, and draining fluid from parts upon removal from a dip tank, by tilting the parts.

SUMMARY

In one aspect, the invention provides a tilting carrier assembly for a finishing process. The tilting carrier assembly includes a load bar configured to convey a work piece relative to a work station. A skid is configured to receive the work piece. Each of a pair of links is pivotally coupled to the load bar at a first end and pivotally coupled to the skid at an opposite second end. A horizontal span between the first ends of the pair of links is substantially greater than a horizontal span between the second ends of the pair of links.

In another aspect, the invention provides a tilting carrier assembly. The tilting carrier assembly includes a load bar configured to convey a work piece relative to a work station. A skid is configured to receive the work piece. Each of a pair of links is pivotally coupled to the load bar at a first end and pivotally coupled to the skid at an opposite second end. The pair of links is configured so that tilting of the load bar to a first angle relative to horizontal results in tilting of the skid to a second angle relative to horizontal, the second angle being at least 50 percent greater than the first angle.

In yet another aspect, the invention provides a tilting carrier assembly. The tilting carrier assembly includes a load bar configured to convey a work piece relative to a work station. A skid is configured to receive the work piece. Each of a pair of links is pivotally coupled to the load bar at a first end and pivotally coupled to the skid at an opposite second end. The skid is responsive to tilt relative to horizontal by an amount greater than the load bar, solely by the force of gravity, in response to tilting of the load bar relative to horizontal.

In yet another aspect, the invention provides a tilting carrier assembly. The tilting carrier assembly includes a load bar configured to convey a work piece relative to a work station. A skid is configured to receive the work piece. Each of a pair of links is coupled to the load bar at a first end and coupled to the skid at an opposite second end. A horizontal spacing between the second ends of the pair of links decreases at an accelerated rate compared to a decrease in a horizontal spacing between the first ends of the links when the load bar is tilted.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
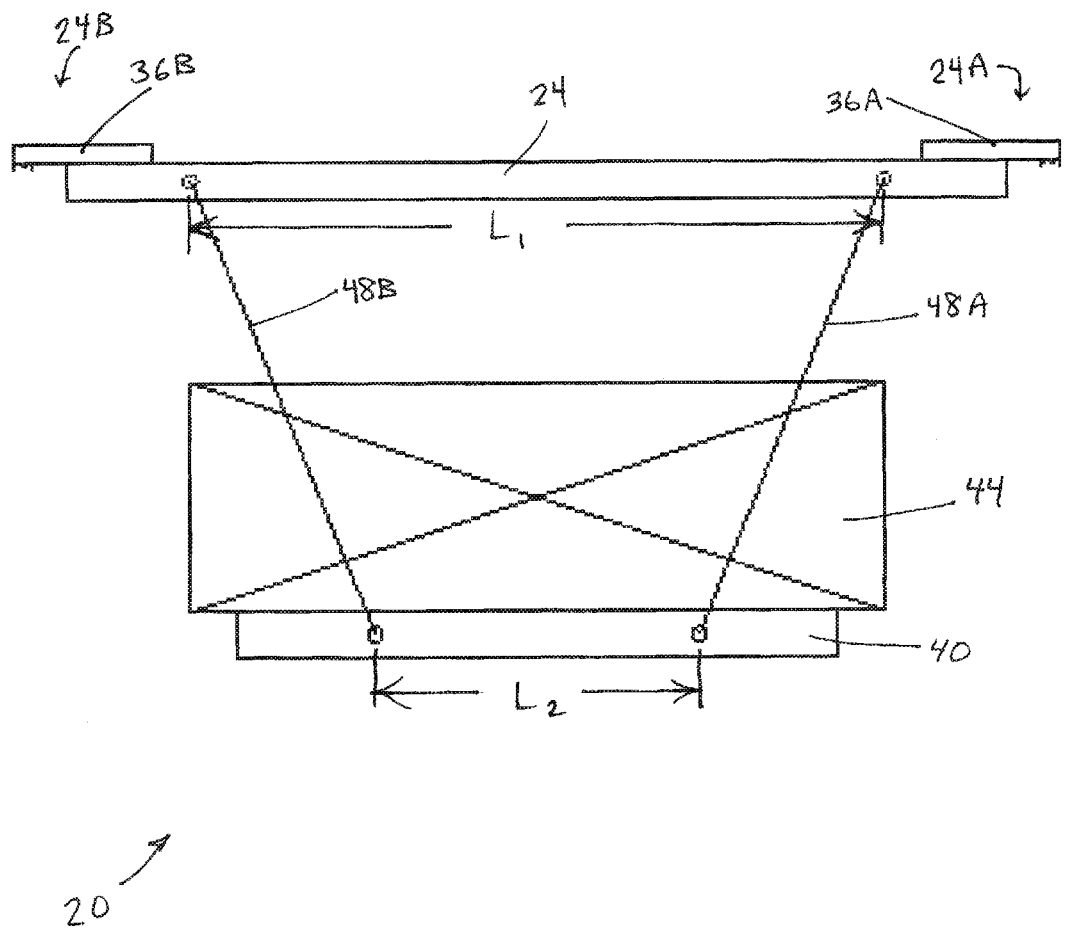
FIG. 1 is a side view of a tilting carrier assembly according to one aspect of the invention.

A tilting carrier assembly 20 is illustrated in FIG. 1. The tilting carrier assembly 20 includes a primary carrier or load bar 24 configured to be transported between a plurality of work stations 28 by a conveyor 32 (FIGS. 2 and 3) as part of a conveyor system, as described in further detail below. The conveyor 32 can define a primary direction of travel A, which is substantially horizontal in the illustrated construction. The load bar 24 can be a rigid structure having a first end 24A and a second end 24B opposite the first end 24A. The load bar 24 can be coupled to the conveyor 32 at a first coupling 36A adjacent the first end 24A and a second coupling 36B adjacent the second end 24B. The first and second couplings 36A, 36B can be spaced along the primary direction of travel A to constitute forward and rearward couplings. However, the first and second couplings 36A, 36B can be positioned side by side at a common position along the primary direction of travel A as shown in FIGS. 4-7, or at a skewed orientation with respect to the primary direction of travel A.

A work piece support or skid 40 is provided below the load bar 24, supported by the load bar 24 as a secondary carrier. A work piece 44 is supported by the skid 40 in fixed relationship therewith. The work piece 44 can be coupled to the skid 40 in any one of a number of different manners. Also, the work piece 44 can be coupled to any one of a top, bottom, or side of the skid 40, and can be directly or indirectly fastened to the skid 40. In the illustrated construction, the work piece 44 is supported directly on top of the skid 40. Regardless of the manner of fastening, the work piece 44 moves with the skid 40 (i.e., when the skid 40 is conveyed or tilted, the work piece 44 is conveyed or tilted the same amount). However, as will be described in greater detail below, the skid 40 and the work piece 44 are configured to tilt to an amplified degree in response to tilting of the load bar 24.

The skid 40 is supported below the load bar 24 by a pair of links, including a first link 48A and a second link 48B. As illustrated, the first link 48A is a forward link and the second link 48B is a rearward link. Each of the links 48A, 48B is coupled at an upper end to the load bar 24 and at a lower end to the skid 40. The links 48A, 48B can be pivotally coupled to both the load bar 24 and the skid 40 (e.g., with pivot pins, bearings, etc.). The links 48A, 48B can be rigid members, such as beams, rods, poles, shafts, or bars, in some constructions. However, in other constructions, the links 48A, 48B can be flexible members such as chains, cables, ropes, etc. In such constructions, the attachment points of the links 48A, 48B to the load bar 24 and the skid 40 can be but need not be provided with special pivoting hardware, since the links 48A, 48B can pivot naturally adjacent the connection points by virtue of their flexure or other movement to define pivotal couplings or attachment points. Whether the links 48A, 48B are rigid or non-rigid, the skid 40 is configured to hang from the load bar 24 via the links 48A, 48B, which together with the load bar 24 and the skid 40, can define a four-bar linkage. It will be appreciated that the illustrated set of links 48A, 48B can be a first set of links and that a substantially identical second set of links 48A, 48B can be provided on an opposite side of the tilting carrier assembly 20. On the other hand, if the links 48A, 48B are of suitable rigidity, and the connection points are of suitably robust for the intended loads, the tilting carrier assembly 20 may only be provided with a single set of links 48A, 48B located on either side, the middle, or other location on the tilting carrier assembly 20.

As shown in FIG. 1, a length $L_1$ between the upper connection points of the first and second links 48A, 48B is substantially larger than a length $L_2$ between the lower connection points of the first and second links 48A, 48B. In some constructions, the length $L_2$ between the lower connection points of the first and second links 48A, 48B is 70 percent or less than the length $L_1$ between the upper connection points of the first and second links 48A, 48B. In some constructions, the length $L_2$ between the lower connection points of the first and second links 48A, 48B is 50 percent or less than the length $L_1$ between the upper connection points of the first and second links 48A, 48B. In the illustrated construction, the length $L_2$ between the lower connection points of the first and second links 48A, 48B is between about 40 percent and about 55 percent of the length $L_1$ between the upper connection points of the first and second links 48A, 48B.

The load bar 24 can be one or more beams, bars, rods, tubes, plates, combination thereof, or other type of structure of either solid or hollow construction that is configured to maintain the attachment points of the upper ends of the links 48A, 48B at the fixed length $L_1$. Likewise, the skid 40 can take any one of a plethora of different forms and constructions that maintain the attachment points of the lower ends of the links 48A, 48B at the fixed length $L_2$. By non-limiting example, the skid 40 can include a frame, platform, fixture, bucket, basket, or barrel.

In the illustrated construction, the links 48A, 48B are of substantially equal length. Thus, the linkage formed by the load bar 24, the links 48A, 48B, and the skid 40 is shaped as a downwardly-tapered isosceles trapezoid when the load bar 24 is in a horizontal orientation. In other embodiments, however, the links 48A, 48B may have different lengths that can generate a tilted orientation of the skid 40 with respect to the load bar 24 in one or more orientations of the load bar 24 (e.g., horizontal or tilted orientations). The links 48A, 48B are also centered front-to-back along the load bar 24 and the skid 40, although other configurations are optional.

Due to the configuration of the linkage, the skid 40 and the work piece 44 are configured to tilt passively, solely by the force of gravity without another drive force, to a greater degree than the load bar 24, when the load bar 24 is tilted relative to horizontal. The mechanism takes advantage of the short length $L_2$ between the attachment points of the links 48A, 48B on the skid 40, which allows the combined center of gravity of the skid 40 and the work piece 44 to promote greater tilting of the skid 40 in relation to horizontal as compared to that of the load bar 24. In fact, the skid 40 and the work piece 44 can tilt to an angle β with respect to horizontal that is at least 50 percent more than the load bar 24 when the load bar 24 is tilted to an angle α with respect to horizontal. In some constructions, the skid 40 and the work piece 44 can tilt at least 20 percent more than the load bar 24 when the load bar 24 is tilted. Also, in some constructions, the skid 40 and the work piece 44 can tilt at least 50 percent more than the load bar 24 when the load bar 24 is tilted. In still other constructions, the skid 40 and the work piece 44 can tilt at least 100 percent more (twice the angular tilt) when the load bar 24 is tilted. In the illustrated construction, the angle β of tilt of the skid 40 and the work piece 44 can be up to 2.5 times the angle α of tilt of the load bar 24 (e.g., 20 degrees versus 8 degrees). During tilting, the horizontal spacing between the attachment points of the links 48A, 48B on the skid 40 decreases at an accelerated rate compared to a decrease in a horizontal spacing between the attachment points of the links 48A, 48B on the load bar 24. The amplified tilting of the skid 40 and the work piece 44 allows much more clearance or freedom of space around the load bar 24 and requires less vertical driving input from the conveyor 32 to achieve a particular amount of tilt of the work piece 44.

Figure 2:
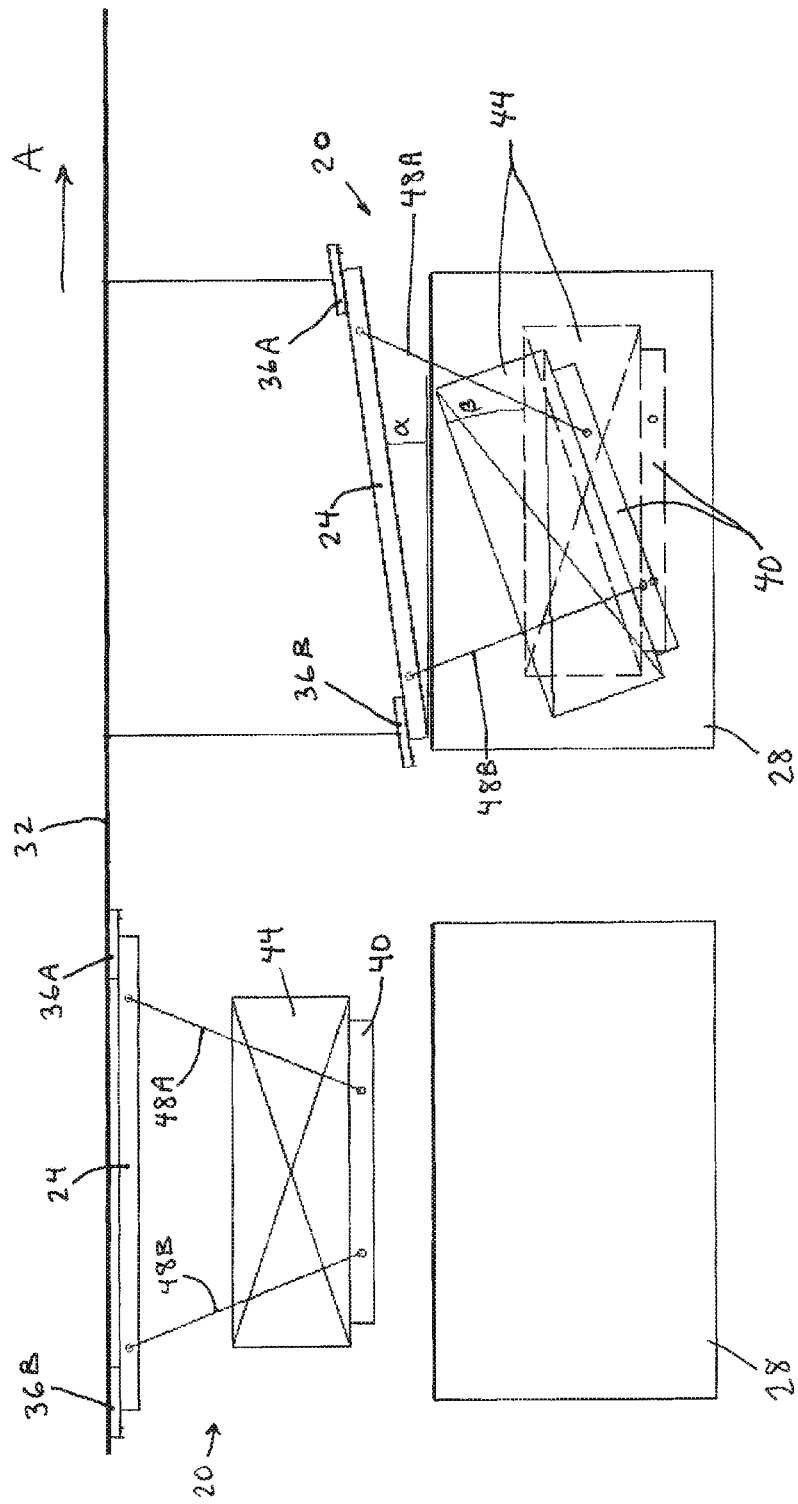
FIG. 2 is a side view of a treatment system for conveying a plurality of tilting carrier assemblies between a plurality of work stations, one of the tilting carrier assemblies being immersed and tilted at one of the work stations.
Figure 3:
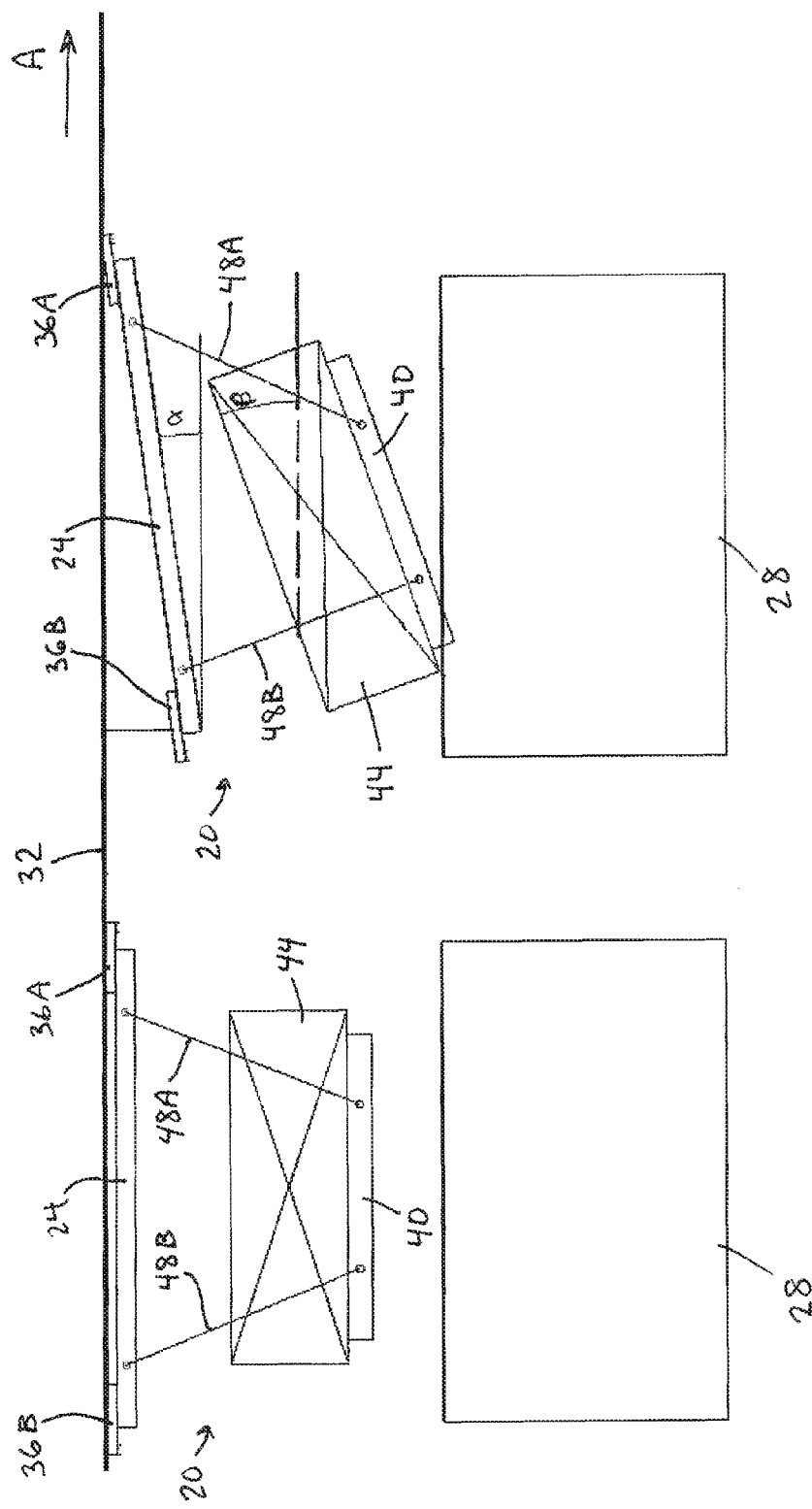
FIG. 3 is a side view of the treatment system of FIG. 2, one of the tilting carrier assemblies being removed from and tilted above one of the work stations.
Figure 5:
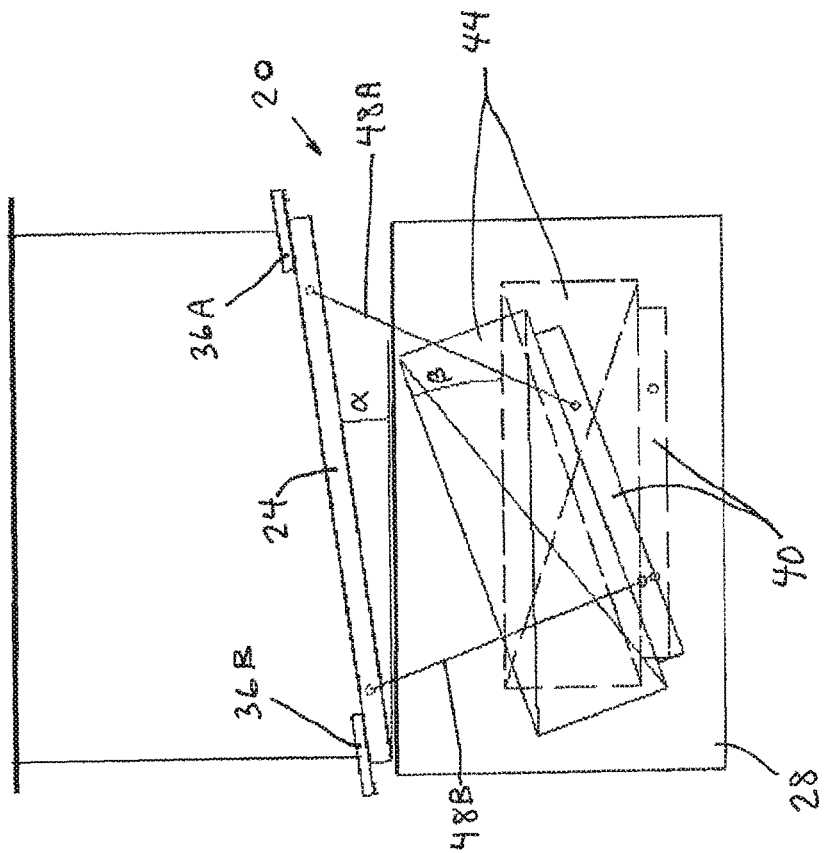
FIG. 5 illustrates the tilting carrier assembly of FIG. 4 immersed in a tank and tilted at the work station.
Figure 4:
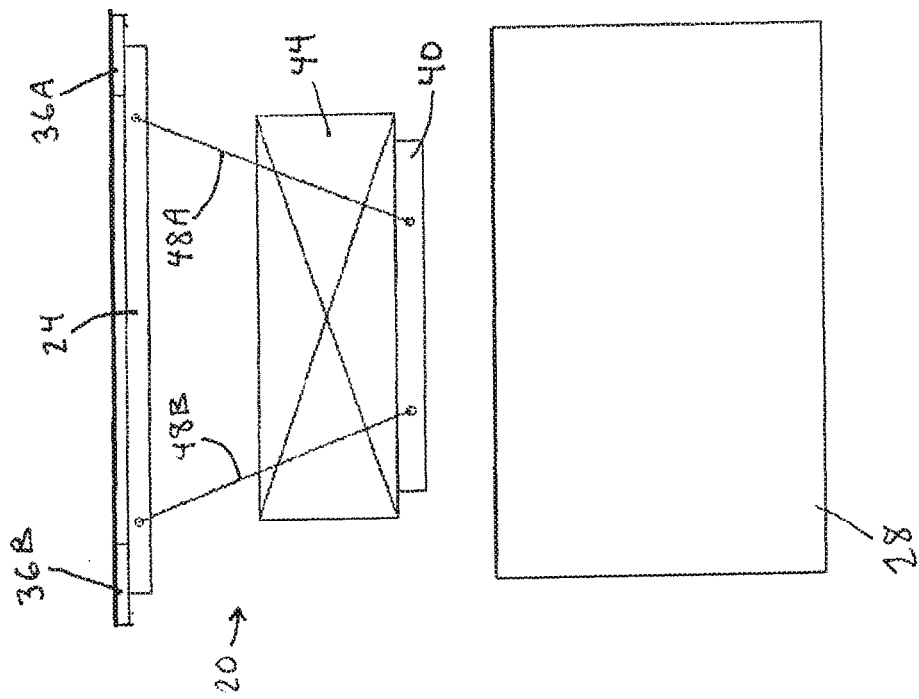
FIG. 4 illustrates a treatment system similar to FIGS. 2 and 3, having an alternate orientation with respect to a primary direction of travel, which is into or out of the page as viewed in FIG. 4.
Figure 7:
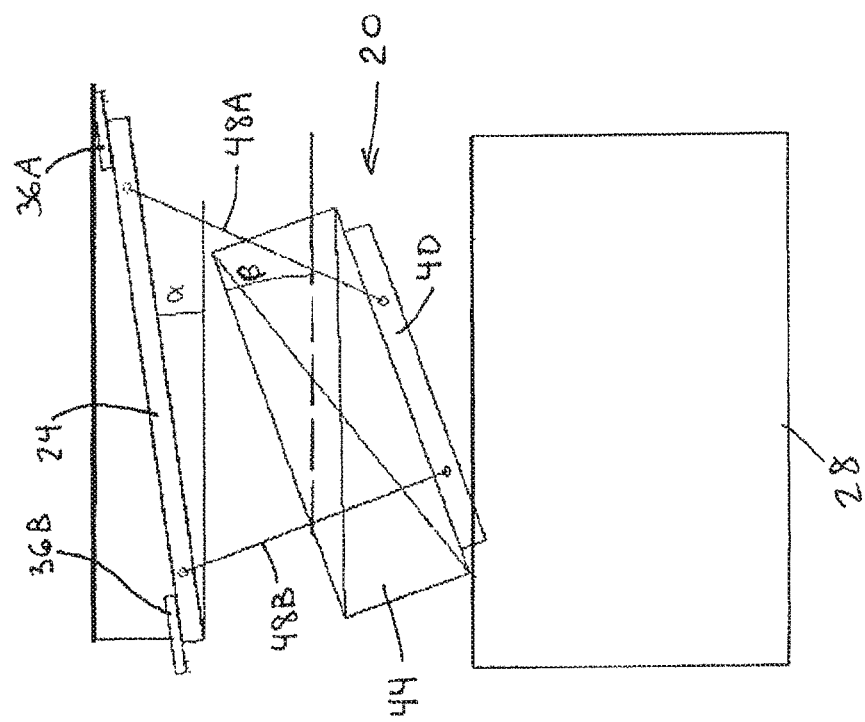
FIG. 7 illustrates the tilting carrier assembly of FIGS. 4-6 tilted above the tank at the work station.
Figure 6:
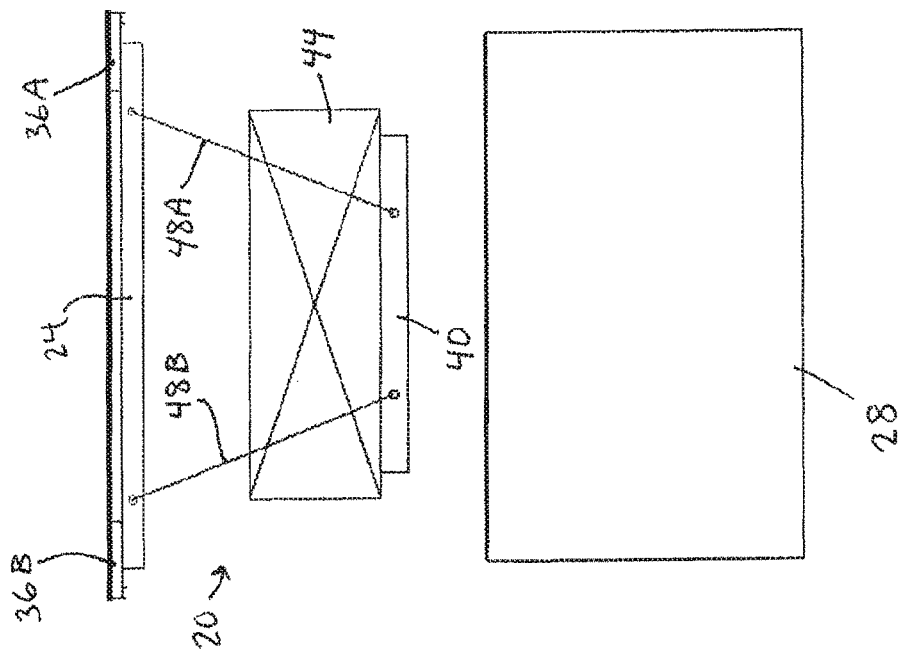
FIG. 6 illustrates the tilting carrier assembly of FIGS. 4 and 5 lifted from the tank at the work station.

FIGS. 2 and 3 illustrate a conveyor system including a plurality of tilting carrier assemblies 20, each movable along the primary direction of travel A by the conveyor 32 between the plurality of work stations 28. The conveyor 32 can be part of any overhead conveyor system, such as the systems disclosed in U.S. Pat. No. 4,942,956 and U.S. Pat. No. 5,012,918. Further, the conveyor system can be adapted accordingly so it moves in any suitable direction. The work stations 28 can include finishing stations, such as electrocoating immersion tanks for submerging the work piece 44 into an electrocoating liquid. However, the work stations 28 can also include other types of equipment, such as an oven or drying station, a paint spray station, and the like. At one or more of the work stations 28, it may be desirable to tilt the work piece 44 to enhance the finish quality. For example, tilting of the work piece 44 while immersed in an electrocoating bath (FIG. 2) promotes full and even coverage, and tilting of the work piece 44 after removal from the bath (FIG. 3) promotes full drainage.

A process of conveying one or more work pieces 44 through a finishing process can include the following steps. First, the work piece 44 is secured to the skid 40. The conveyor 32 is operated to transport the work piece 44 to a work station 28. The conveyor 32 may transport the work piece 44 directly into the work station 28 along the primary direction of travel A, or may first transport the work piece 44 to a position above the work station 28 (e.g., in the case of an immersion tank holding an electrocoating liquid). A vertical drive may lower the tilting carrier assembly 20 from the conveyor 32 so that the work piece 44 is lowered into the work station 28. The vertical drive can include any suitable system for producing the required vertical travel. Alternately, the conveyor 32 may follow a path that descends to allow the work piece 44 to descend into the work station 28. The work piece 44 can be lowered while traveling along the conveyor 32 or after stopping at a position along the conveyor 32 corresponding to the desired work station 28. While in the work station 28, the load bar 24 is tilted a predetermined amount with respect to horizontal, and the skid 40 and work piece 44 are tilted passively by an amount substantially greater than the load bar 24. The load bar 24 can be tilted by unequal vertical movement of the first and second couplings 36A, 36B, in any combination of upward and downward movement, or moving one of the couplings 36A, 36B while holding the other at a fixed height. Any suitable device (e.g., one or more cranes or winches, hydraulic or pneumatic pistons, changes in conveyor elevation on different sides and/or at different locations along the conveyor 32, etc.) may be utilized to obtain the tilt of the load bar 24. The tilting process may be repeated as desired within the work station 28, before the work piece 44 is moved out of the work station 28 (e.g., lifted out of an immersion tank). In some cases, the load bar 24 may be tilted one or more times after removal from the work station 28 (e.g., above an immersion tank to drain liquid from the work piece 44). The work piece 44 is then transported via the conveyor 32 to another work station 28 or to an unloading area of the conveyor system.

The system and method described herein are applicable for any number of work stations 28. In some constructions, the work piece support (referred to herein as the skid 40) may carry more than one work piece. In some such constructions, the one or more work pieces may not be immovably secured to the work piece support to tilt in fixed relationship therewith, but it still may be desirable to produce amplified tilting of the work piece support.

Various features and advantages of the invention are set forth in the following claims.

What is claimed is:

1. A method of operating a tilting carrier assembly, the method comprising:
    operating a conveyor in a primary direction of travel;
    supporting a work piece from the conveyor by a pair of links, wherein a pair of respective upper connection points of the pair of links are laterally spaced transverse to the primary direction of travel and a pair of respective lower connection points of the pair of links are laterally spaced transverse to the primary direction of travel;
    conveying the work piece along the primary direction of travel relative to a work station;
    tilting the upper connection points so that a line therebetween forms a first angle relative to horizontal; and
    in response to the tilting of the upper connection points to form the first angle, tilting the lower connection points and the work piece to a second angle relative to horizontal, the second angle being greater than the first angle.

2. The method of claim 1, wherein the second angle is at least 50 percent greater than the first angle.

3. The method of claim 1, wherein the second angle is at least twice the first angle.

4. The method of claim 1, wherein the second angle is about 2.5 times the first angle.

5. The method of claim 1, wherein the lower connection points are responsive to tilt solely by the force gravity when the upper connection points are tilted relative to horizontal.

6. The method of claim 1, further comprising conveying the work piece to at least one additional work station.

7. The method of claim 1, further comprising lowering the work piece into the work station.

8. The method of claim 7, further comprising electrocoating the work piece within an immersion tank of the work station.

9. The method of claim 7, further comprising lifting the work piece from the work station and further tilting the upper connection points while the work piece is positioned above the work station.

10. The method of claim 1, further comprising lowering the work piece into a paint spray station of the work station.

11. A method of operating a tilting carrier assembly, the method comprising:
    operating a conveyor in a primary direction of travel;
    supporting a work piece from the conveyor by a pair of links, wherein a pair of respective upper connection points of the pair of links are spaced apart by a first length and a pair of respective lower connection points of the pair of links are spaced apart by a second length that is less than the first length;
    conveying the work piece along the primary direction of travel relative to a work station;
    lowering the work piece into the work station;
    tilting the pair of upper connection points so that a line therebetween forms a first angle relative to horizontal while the work piece is in the work station;
    in response to the tilting the upper connection points to form the first angle, tilting the lower connection points and the work piece to a second angle relative to horizontal, the second angle being greater than the first angle;
    lifting the work piece from the work station; and
    after lifting the work piece from the work station, tilting the pair of upper connection points while the work piece is positioned above the work station.

12. The method of claim 11, wherein the second angle is at least 50 percent greater than the first angle.

13. The method of claim 11, wherein the second angle is at least twice the first angle.

14. The method of claim 11, wherein the second angle is about 2.5 times the first angle.

15. The method of claim 11, wherein the lower connection points are responsive to tilt solely by the force gravity when the upper connection points are tilted relative to horizontal.

16. The method of claim 11, further comprising conveying the work piece to at least one additional work station.

17. The method of claim 11, wherein lowering the work piece into the work station includes lowering the work piece into an immersion tank.

18. The method of claim 17, further comprising electrocoating the work piece within the immersion tank.

19. The method of claim 11, further comprising un-tilting and re-tilting the upper connection points relative to horizontal while the work piece is in the work station.

20. The method of claim 11, wherein lowering the work piece into the work station includes lowering the work piece into a paint spray station.

21. A method of operating a tilting carrier assembly, the method comprising:

operating a conveyor in a primary direction of travel;

conveying a work piece along the primary direction of travel, wherein the work piece is supported by the conveyor with a pair of links that are laterally spaced transverse to the primary direction of travel, each of the pair of links having an upper connection point at a first end and a lower connection point at an opposite second end coupled to the work piece;

tilting the upper connection points while maintaining a fixed first length therebetween to decrease a horizontal spacing between the upper connection points of the pair of links; and decreasing a horizontal spacing between the lower connection points of the pair of links at an accelerated rate compared to the decrease in a horizontal spacing between the upper connection points of the pair of links as the upper connection points are tilted.

\* \* \* \* \*